(12) United States Patent
Parrish et al.

(10) Patent No.: US 7,582,271 B2
(45) Date of Patent: *Sep. 1, 2009

(54) EMISSION CONTROL SYSTEM

(75) Inventors: Clyde F. Parrish, Melbourne, FL (US); J. Landy Chung, Jacksonville, FL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 741 days.

This patent is subject to a terminal disclaimer.

(21) Appl. No.: 11/040,294

(22) Filed: Jan. 14, 2005

(65) Prior Publication Data

US 2005/0255022 A1 Nov. 17, 2005

Related U.S. Application Data

(63) Continuation-in-part of application No. 10/845,418, filed on May 11, 2004.

(51) Int. Cl.
  *B01D 53/50* (2006.01)
  *B01D 53/86* (2006.01)
  *C01B 17/69* (2006.01)
  *B01J 19/00* (2006.01)
  *B01D 50/00* (2006.01)

(52) U.S. Cl. ............. 423/243.01; 423/235; 423/242.1; 423/522; 422/108; 422/172

(58) Field of Classification Search ............... 423/210, 423/235, 242.1, 243.01, 393, 522; 422/105, 422/108, 168, 169, 170, 172, 173
See application file for complete search history.

(56) References Cited

U.S. PATENT DOCUMENTS

| | | | | |
|---|---|---|---|---|
| 3,733,393 A | * | 5/1973 | Couillaud et al. | 423/243.01 |
| 4,233,274 A | * | 11/1980 | Allgulin | 423/210 |
| 5,112,587 A | * | 5/1992 | von Wedel et al. | 423/235 |
| 5,397,549 A | * | 3/1995 | Newman | 423/235 |
| 5,595,713 A | * | 1/1997 | Gohara et al. | 422/170 |
| 2005/0214187 A1 | * | 9/2005 | Johnson | 423/235 |

* cited by examiner

*Primary Examiner*—Jerry Lorengo
*Assistant Examiner*—Kevin M Johnson
(74) *Attorney, Agent, or Firm*—Randall M. Heald; Thomas W. Leffert

(57) ABSTRACT

Methods and apparatus utilizing hydrogen peroxide are useful to reduce SOx and mercury (or other heavy metal) emissions from combustion flue gas streams. The methods and apparatus may further be modified to reduce NOx emissions. Continuous concentration of hydrogen peroxide to levels approaching or exceeding propellant-grade hydrogen peroxide facilitates increased system efficiency. In this manner, combustion flue gas streams can be treated for the removal of SOx and heavy metals, while isolating useful by-products streams of sulfuric acid as well as solids for the recovery of the heavy metals. Where removal of NOx emissions is included, nitric acid may also be isolated for use in fertilizer or other industrial applications.

15 Claims, 3 Drawing Sheets

EMISSION CONTROL SYSTEM

RELATED APPLICATION

This application is a continuation-in-part of U.S. patent application Ser. No. 10/845,418 titled "Emission Control System" and filed May 11, 2004, which is commonly assigned and incorporated herein by reference in its entirety.

TECHNICAL FIELD OF THE INVENTION

The present invention relates generally to emission control and in particular to the control of emissions from combustion sources.

BACKGROUND OF THE INVENTION

Control of emissions from fossil fuel combustions sources addresses a major environmental problem. The Environmental Protection Agency (EPA) through the Clean Air Act regulates the emissions from fossil fuel-fire power plants. Initial regulations were focused on oxides-of-nitrogen (NOx) and oxides-of-sulfur (SOx) emissions, but newer regulations will include provisions to control heavy metals (Hg, etc.) and carbon dioxide.

Gas streams from combustion processes are often scrubbed, i.e., contacted with water or water solutions, to remove many of their contaminants. However, these scrubbing processes often produce hazardous waste streams that must be dealt with.

For the reasons stated above, and for other reasons stated below that will become apparent to those skilled in the art upon reading and understanding the present specification, there is a need in the art for alternative methods and apparatus for treating combustion gas streams.

SUMMARY

Methods and apparatus utilizing hydrogen peroxide to reduce SOx, NOx and mercury or other oxides-of-metal emissions are described herein. Continuous concentration of hydrogen peroxide ($H_2O_2$) to levels approaching or exceeding propellant-grade hydrogen peroxide facilitates increased system efficiency. By utilizing methods and apparatus in accordance with the invention, combustion flue gas streams can be treated for the removal of SOx, NOx and heavy metals, while isolating useful by-products streams of sulfuric acid and nitric acid as well as solids for the recovery of the heavy metals. The apparatus is modular and components can be added or removed depending upon the specific requirements for a given removal operation.

The invention further includes methods and apparatus of varying scope.

DETAILED DESCRIPTION OF THE INVENTION

In the following detailed description of the preferred embodiments, reference is made to the accompanying drawings that form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and chemical changes may be made without departing from the spirit and scope of the present invention. It is noted that the drawings are not to scale unless a scale is provided thereon. The following detailed description is, therefore, not to be taken in a limiting sense, and the scope of the present invention is defined only by the appended claims and equivalents thereof.

Emission control systems in accordance with the invention address environmental pollutants SOX, NOx, and heavy metals. Such systems are designed to control emissions of these environmental pollutants to the levels established by the EPA. This emission control system provides a method based on hydrogen peroxide to reduce the SOx, NOx, and metal and metal oxide emissions from combustion sources to acceptable levels as established by the Environmental Production Agency. In addition, useful by-product streams of sulfuric acid, nitric acid, salts of these acids, and feedstock for oxides-of-metal production may be isolated.

Figure 1:
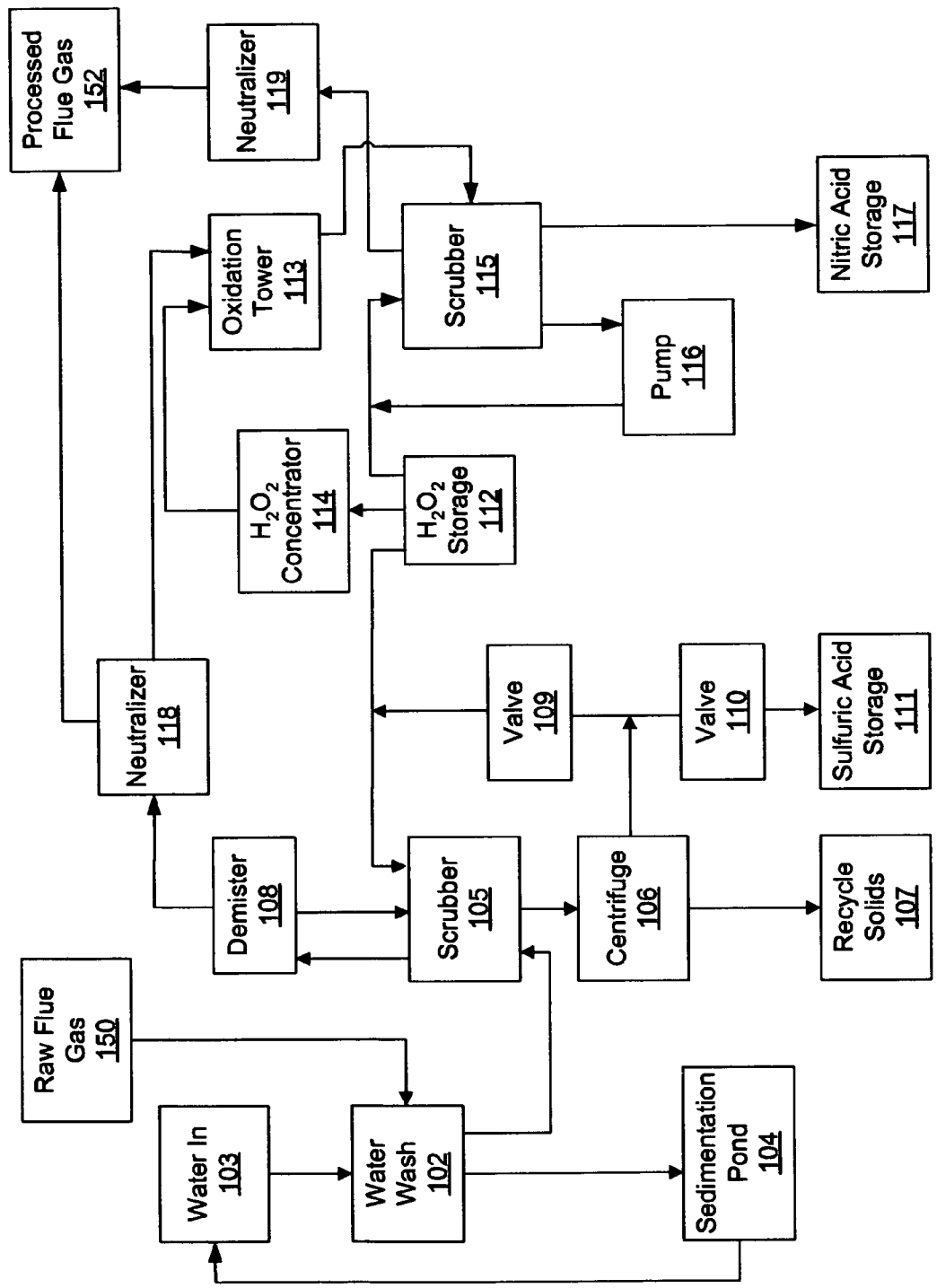
FIG. 1 is a block schematic of an emission control system in accordance with an embodiment of the invention.

FIG. 1 is a block schematic of an emission control system in accordance with an embodiment of the invention. The process starts with a gas stream, such as raw flue gas 150 after the particulates have been removed. There are several options for this design and steps can be omitted or alternate unit operations may be substituted for the general processes depending on the requirements of the installation. These alternate steps are noted during the description of the process.

The first step of the process is to use a cooling and wash chamber 102 to cool and remove some of the particulates in the entering flue gas 150. Process water from chamber 103 is provided to chamber 102. Particulates, wash water and heat are sent from chamber 102 to the sedimentation and cooling Pond 104. Water is then re-circulated from pond 104 back to water chamber 103.

The washed flue gas is fed from wash chamber 102 to a scrubber tower 105 for the removal of SOx and/or heavy metals. Scrubber tower 105 uses hydrogen peroxide from hydrogen peroxide storage 112 to oxidize sulfurous acid ($H_2SO_3$) to sulfuric acid ($H_2SO_4$) to prevent reemission of $SO_2$. Hydrogen peroxide storage 112 preferably provides aqueous hydrogen peroxide of approximately 50% to 70% by volume, and more preferably at approximately 70% by volume. As the scrubber liquor pH decreases due to the formation of sulfuric acid, most of the heavy metal oxides, including Hg, etc., are dispersed as metal oxides and/or dissolved hydroxides are converted to sulfates. The remaining un-dissolved particulates and insoluble sulfates are removed with centrifuge 106, e.g., a solid-bowl centrifuge. Centrifuge 106 continuously removes the solids and circulates the scrubber liquor through value 109 back to scrubber tower 105 for continuous scrubbing and cleaning the flue gas. When the scrubber liquor (sulfuric acid) reaches the desired concentration, the cleaned scrubber liquor is discharged from the centrifuge 106 through valve 110 then drained to sulfuric acid storage 111, which can then be utilized for fertilizer or industrial uses. The solids from centrifuge 106 are discharged to the recycle solids container 107. Soluble metals and metal oxides present in the cleaned scrubber liquor may further be removed as insoluble solids upon neutralization of the sulfuric acid as may be performed, for example, during the production of fertilizer.

The concentration of hydrogen peroxide in the first scrubbing mixture is maintained at a predetermined level, e.g., 0.1 to 5 percent by volume. Concentration of the first scrubbing mixture may be maintained using a hydrogen peroxide controller of the type described below. Additional detail of such a controller may be found in U.S. Pat. No. 6,039,783 issued Mar. 21, 2000 to Lueck et al. and U.S. Pat. No. 6,641,638 issued Nov. 4, 2003 to Lueck et al.

When the flue gas exits the scrubber 105 it contacts the demister 108, where the mist that contains sulfuric acid coalesces. The coalesced mist is returned to the scrubber 105 and the desulfurized flue gas flows to the neutralizer 118. Residual acid gases are neutralized with a base in neutralizer 118, and then the cleaned and neutralized flue gas exits through the exhaust stack. Alternately, an exhaust fan could be used in place at the outlet of the neutralizer 118, if desired, to boost the clean and neutralized flue gas out of the exhaust stack as processed flue gas 152.

When or if removal of $NO_x$ emissions is also desired, the neutralized flue gas from neutralizer 118 flows to NO oxidation tower 113, where nitric oxide (NO) is oxidized to nitrogen dioxide ($NO_2$). Alternatively, the flue gas may be passed directly from the demister 108 to the NO oxidation tower 113 for later neutralization, eliminating neutralizer 118. Hydrogen peroxide ($H_2O_2$) from the peroxide storage 112 may be concentrated in hydrogen peroxide concentrator 114 or pumped directly into NO oxidation tower 113. The concentrator 114 is used to increase the concentration of $H_2O_2$ from 70 percent to as high as 85 percent or more as required by the process. While a variety of methods are known for the concentration of hydrogen peroxide, examples particularly suited for use with embodiments of the invention may be found in U.S. Pat. No. 7,122,166.

Oxidation tower 113 decomposes hydrogen peroxide into oxidative species that convert NO into $NO_2$. One example of this process, the catalytic decomposition of hydrogen peroxide, is described in U.S. Pat. No. 6,793,903. The oxidized NO in the flue gas flows from the oxidation tower 113 to the $NO_x$ scrubber tower 115 where it is captured in an acidic hydrogen peroxide scrubber liquor. The concentration of hydrogen peroxide in the second scrubbing mixture ranges from 0.1 to 5 percent by volume and is controlled by a second hydrogen peroxide controller. The cleaned flue gas that exits from scrubber tower 115 passes into neutralizer 119, where base is added to neutralize any residual acid gases. Once neutralized, the cleaned flue gas exits through the exhaust stack as processed flue gas 152. Alternately, an exhaust fan could be used in place at the outlet of the Neutralizer 119, if desired, to boost the clean and neutralized flue gas out of the exhaust stack as processed flue gas 152.

ASTM methods D-1608 and D-1609 have been used to measure the concentration of $NO_x$ in the gas streams in early field tests of the emission control system. These methods were later modified to measure the nitrite and nitrate ions directly by ion chromatography. However, these methods required off-line analysis that was not practical to use in a continuous process. One optical method (Fourier transform infrared, FTIR) was used to measure the hydrogen peroxide concentration directly. The FTIR analytical method, developed to analyze scrubber liquor samples, measured the hydrogen peroxide concentrations continuously with an attenuated total-reflectance (ATR) cell. A zinc sulfide ATR crystal was used for the alkaline solutions and an AMTIR ATR crystal was used for the acid solutions. Although this analytical method was useful for laboratory samples, it was not selected for the hydrogen peroxide controller.

The analytical system used for the control system, as initially described in U.S. Pat. No. 6,039,783, contains a unique process that controls the concentration of hydrogen peroxide. The process is controlled by a programmable logic controller (PLC) designed to measure the concentration of hydrogen peroxide and to add additional hydrogen peroxide as required to maintain the preset concentration. In addition to the hydrogen peroxide controller, the control system contains two commercial controllers, one for pH and the other to measure the concentration of sulfuric acid, nitric acid, or salts of these acids. These commercial controllers are used to maintain a target pH or concentration and to add reagents as required. Details of the design and operation of the control system are given in the following section.

Figure 2:
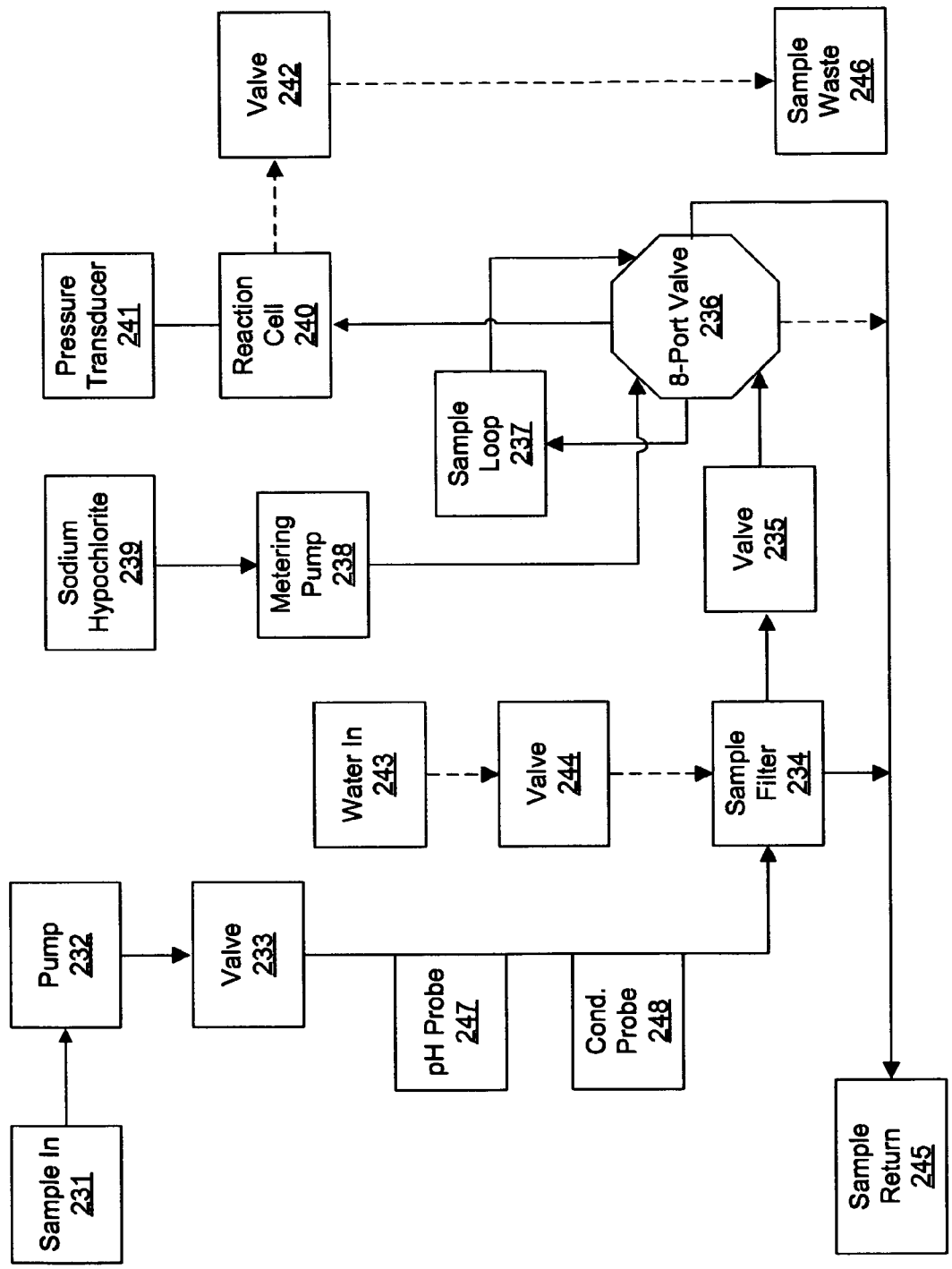
FIG. 2 is a schematic of a hydrogen peroxide concentration control system for use in accordance with one embodiment of the invention.

The block flow diagram for a hydrogen peroxide controller suited for use with embodiments of the invention is shown in FIG. 2. The hydrogen peroxide PLC that controls the operations starts the first sequence by pulling a sample into the system from sample point 231 with pump 232 and pumping it through valve 233. The pH probe 247 and conductivity probe 248 are exposed to the sample before passing the sample into metallic filter 234 where a portion of the sample passes through the filter 234 and the remainder bypasses the filter 234 and washes the residues back to sample return 245. The filtrate that passed through filter 234 continues through valve 235, multiport valve 236, and sample loop 237. From sample loop 237 the sample returns to multiport valve 236, and then exits and returns back to sample return 245. The sequence of events described above serves to collect a sample from the sample point 231, filter the sample, fill the sample loop that has a known volume, and returns the unused sample to sample return 245. While the sample loop 237 is being filled, the metering pump 238 is pulls sodium hypochlorite from container 239 and injects a known volume into reaction cell 240 through multiport valve 236. The second sequence is triggered by the PLC, which sends a signal to rotate multiport valve 236 and pump a second quantity of sodium hypochlorite, but this time it is used to displace the sample from the sample loop 237, which is pumped into the reaction cell 240. The reaction of sodium hypochlorite with hydrogen peroxide produces water, sodium chloride, and oxygen, which causes an increase in pressure in the reaction cell that is sensed by the pressure transducer 241. Calibration data programmed into the PLC for pressure change as a function of hydrogen peroxide concentration is used to control the concentration of hydrogen peroxide in the system. If the measured concentration is below the set concentration, a pump is activated to transfer hydrogen peroxide from storage. The hydrogen peroxide pump stops, when the measured concentration is greater than the set concentration. This cycle is repeated continuously to maintain the set concentration of hydrogen peroxide. While the concentration is being measured, the filter 234 is back-flushed with water 243 through valve 244 to remove particulates captured by the filter 234. When the back-flush starts, valve 233 closes and pump 232 stops and the water 243 pushes through the filter 234 and back to the sample return 245. In addition, the contents of the reaction cell may be expelled through valve 242 to sample waste 246 at this time. Once the back-flush is complete, the PLC returns the process to the first sequence and sampling process start over again.

Figure 3:
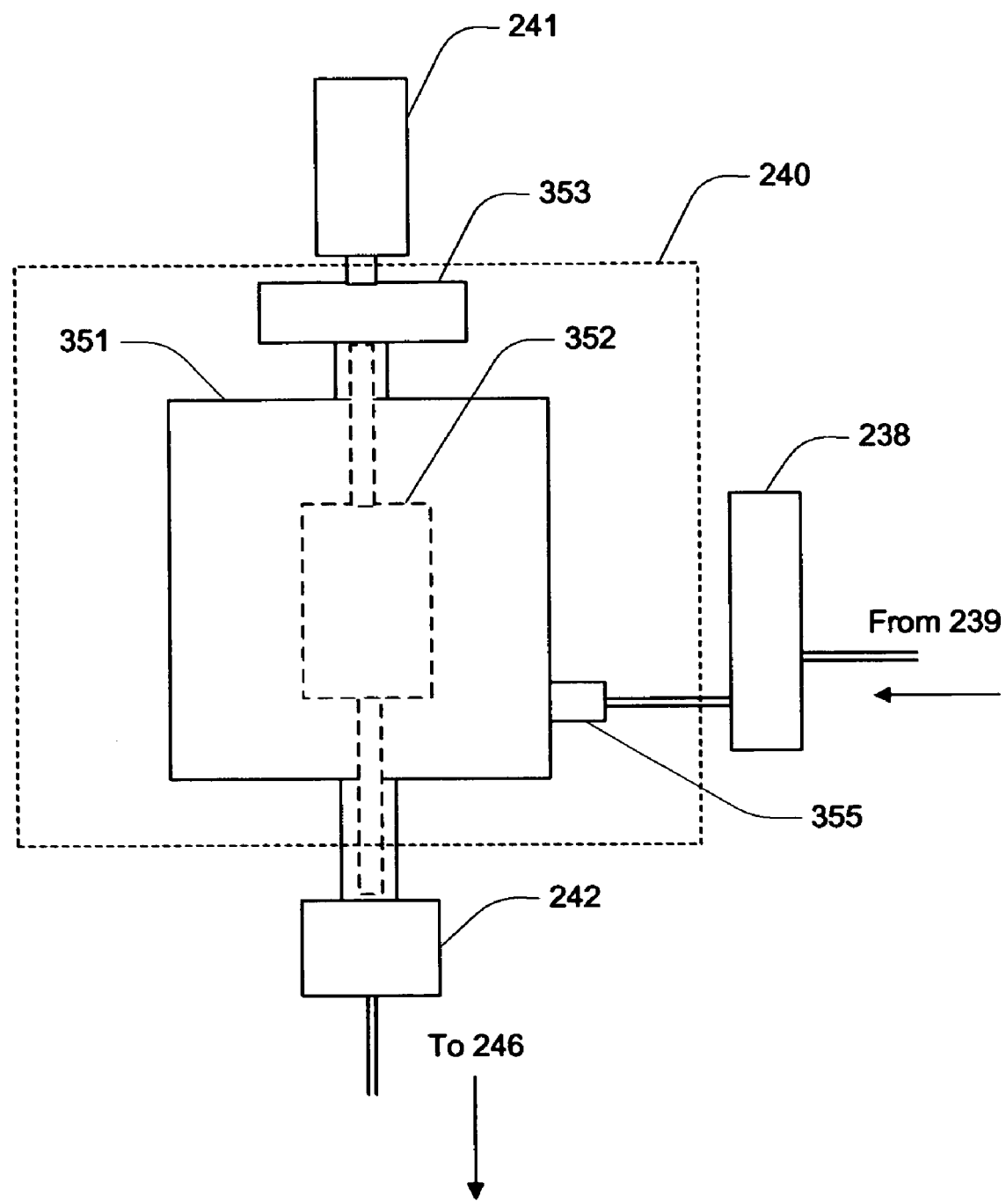
FIG. 3 is a hydrogen peroxide reaction vessel subsystem for use in accordance with one embodiment of the invention.

FIG. 3 shows the details of the reaction cell 240. The reaction cell body 351 has an internal chamber 352 that is attached to a gauge guard 353 that protects the pressure transducer 241. Sodium hypochlorite and the sample are pulled through sodium hypochlorite inlet 355 by metering pump 238. Once the reaction in the pressure cell is complete, it is discharged through valve 242 to sample waste 246. The reaction cell is fabricated preferably from a machinable corrosion-resistant polymer. While the foregoing brief description of the control of hydrogen peroxide concentration is included to aid the reader, a more detailed description is provided in U.S. Pat. No. 6,039,783 and U.S. Pat. No. 6,641,638 as noted previously.

The pH may be controlled with commercially-recognized devices, such as Rosemont's model 0054pH/ORP-08 pH controller and a model 306P-02010055 pH probe. The pH probe is item 247 in FIG. 2 and it is used to continuously measure the pH. The pH controller system has proportional algorithms that adjust the pump feed rate as the pH set-point is approached. For one embodiment, the pH is controlled to a level of between 7.0 and <0.1 by adding a base, e.g., potassium hydroxide. The concentration of sulfuric acid, nitric acid, or salts of these acids, is controlled with the Rosemont model 1054B % 1-99 controller. The conductivity probe model 228-02-21-54-61 is item 248 in FIG. 2. Once calibrated for the specific ion used in the system, the proportional control algorithms adjust pumping rate for the base used to form the salts.

CONCLUSION

Methods and apparatus for controlling emissions have been described. The methods utilize hydrogen peroxide to reduce SOx and mercury (or other oxides-of-metal) emissions. Continuous concentration of hydrogen peroxide to levels approaching or exceeding propellant-grade hydrogen peroxide facilitates increased system efficiency. By utilizing methods and apparatus in accordance with the invention, combustion flue gas streams can be treated for the removal of SOx and oxides-of-metal, while isolating useful by-products streams of sulfuric acid and as well as solids for the recovery of the heavy metals. The methods and apparatus may also be extended to reduce NOx emissions. One of the significant advantages of the present invention is the fact that the process can be run continuously, with measuring and adjustments made in real time while the process is being performed. Computer monitoring can initiate flow changes of reagents in response to automatic measurements to maintain desired process conditions.

Although specific embodiments have been illustrated and described herein, it will be appreciated by those of ordinary skill in the art that any arrangement that is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A method of treating a gas stream for removal of at least oxides of sulfur, the method comprising:
    scrubbing the gas stream with a first hydrogen peroxide solution, thereby producing a first scrubber liquor;
    measuring a hydrogen peroxide concentration in the first scrubber liquor;
    maintaining a desired hydrogen peroxide concentration in a scrubbing mixture of the first hydrogen peroxide solution and a recycled first scrubber liquor by regulating a flow of the first hydrogen peroxide solution in response to the measured hydrogen peroxide concentration of the first scrubber liquor;
    removing a by-product stream containing sulfuric acid after attaining a desired sulfuric acid concentration in the first scrubber liquor;
    after scrubbing the gas stream with the first hydrogen peroxide solution, oxidizing the gas stream using a second hydrogen peroxide solution in an oxidation process adapted to convert nitric oxide to nitrogen dioxide, using catalytic decomposition of the second hydrogen peroxide solution to produce oxidative species that convert nitric oxide to nitrogen dioxide; and
    after oxidizing the gas stream, scrubbing the gas stream with a third hydrogen peroxide solution and removing a by-product stream containing nitric acid;
    wherein the second hydrogen peroxide solution is concentrated to a level of approximately 75% or more by volume prior to use in oxidizing the gas stream.

2. The method of claim 1, wherein scrubbing the gas stream with the first hydrogen peroxide solution further comprises:
    feeding the gas stream into a scrubber;
    feeding the first hydrogen peroxide solution into the scrubber;
    removing solids from the first scrubber liquor; and
    recycling the first scrubber liquor into the scrubber with the first hydrogen peroxide solution.

3. The method of claim 2, further comprising:
    sampling the first scrubber liquor for a level of hydrogen peroxide; and
    controlling the level of hydrogen peroxide in the scrubbing mixture to be at least a predetermined level.

4. The method of claim 2, wherein removing solids comprises centrifuging the resulting scrubber liquor.

5. The method of claim 1, wherein scrubbing the gas stream with the third hydrogen peroxide solution further comprises:
    feeding the gas stream into a scrubber;
    feeding the third hydrogen peroxide solution into the scrubber;
    removing solids from a resulting second scrubber liquor; and
    recycling the second scrubber liquor into the scrubber with the third hydrogen peroxide solution.

6. The method of claim 5, further comprising:
    sampling the second scrubber liquor for a level of hydrogen peroxide; and
    controlling the level of hydrogen peroxide in a mixture of the third hydrogen peroxide solution and the recycled second scrubber liquor to be at least a predetermined level.

7. The method of claim 6, wherein the predetermined level of hydrogen peroxide is an amount necessary to provide a stoichiometric excess of hydrogen peroxide for reaction with the gas stream.

8. A system for the removal of at least oxides of sulfur from a combustion flue gas, the system comprising:
    a water wash coupled to receive a raw flue gas stream;
    a first scrubber coupled to receive an exit gas stream from the water wash and coupled to receive a first hydrogen peroxide solution;
    a centrifuge coupled to receive a first scrubber liquor from the first scrubber and to provide a recycled scrubber liquor to the first scrubber after removal of solids from the first scrubber liquor;
    a sampling system to determine a hydrogen peroxide concentration and a pH within the first scrubber liquor;
    a control system to maintain a desired hydrogen peroxide concentration in the recycled scrubber liquor and to maintain a desired sulfuric acid concentration in the recycled scrubber liquor;
    a demister coupled to receive an exit gas stream from the first scrubber;

a neutralizer coupled to receive an exit gas stream from the demister;

an oxidation tower coupled to receive an exit gas stream from the demister or the neutralizer, and to receive a second hydrogen peroxide solution from a hydrogen peroxide concentrator, wherein the oxidation tower is adapted to catalytically decompose the second hydrogen peroxide solution;

a second scrubber coupled to receive an exit gas stream from the oxidation tower and coupled to receive a third hydrogen peroxide solution and a recycled liquor from the second scrubber; and a second neutralizer coupled to receive an exit gas stream from the second scrubber.

9. A method of treating a gas stream for removal of heavy metal components and at least oxides of sulfur, the method comprising:

feeding the gas stream into a scrubber;

feeding a first hydrogen peroxide solution into the scrubber;

scrubbing the gas stream with the first hydrogen peroxide solution, thereby producing a first scrubber liquor containing sulfuric acid and insoluble oxides of the heavy metal components;

recycling the first scrubber liquor to the scrubber to attain a desired concentration of sulfuric acid;

determining a hydrogen peroxide concentration of the first scrubber liquor;

controlling the first hydrogen peroxide solution in response to the determined hydrogen peroxide concentration of the first scrubber liquor;

removing solids from the first scrubber liquor, wherein the solids contain at least a portion of the insoluble oxides of the heavy metal components;

neutralizing a portion of the first scrubber liquor after removing solids, wherein the first scrubber liquor further contains soluble forms of the heavy metal components and/or soluble oxides of the heavy metal components and wherein neutralizing the portion of the first scrubber liquor forms second solids from the soluble forms of the heavy metal components and/or the soluble oxides of the heavy metal components; and removing the second solids from the neutralized first scrubber liquor.

10. The method of claim 9, further comprising:

maintaining a desired hydrogen peroxide concentration in the recycled first scrubber liquor by regulating a flow of the first hydrogen peroxide solution; and removing a by-product stream containing sulfuric acid after attaining the desired sulfuric acid concentration in the first scrubber liquor.

11. The method of claim 10, further comprising:

sampling the first scrubber liquor for a level of hydrogen peroxide; and controlling the level of hydrogen peroxide in a mixture of the first hydrogen peroxide solution and the recycled first scrubber liquor to be at least a predetermined level.

12. The method of claim 9, wherein removing solids comprises centrifuging the resulting scrubber liquor.

13. A method of treating a gas stream for removal of mercury and at least oxides of sulfur, the method comprising:

feeding the gas stream into a scrubber;

feeding a first hydrogen peroxide solution into the scrubber;

scrubbing the gas stream with the first hydrogen peroxide solution, thereby producing a first scrubber liquor containing sulfuric acid and insoluble oxides of mercury;

recycling the first scrubber liquor to the scrubber to attain a desired concentration of sulfuric acid;

determining a hydrogen peroxide concentration of the first scrubber liquor;

controlling the first hydrogen peroxide solution in response to the determined hydrogen peroxide concentration;

centrifuging the first scrubber liquor to remove at least a portion of the insoluble oxides of mercury;

neutralizing a portion of the first scrubber liquor after centrifuging, wherein the first scrubber liquor further contains soluble forms of mercury and/or soluble oxides of mercury and wherein neutralizing the portion of the first scrubber liquor forms second solids from the soluble forms of mercury and/or soluble oxides of mercury; and removing the second solids from the neutralized first scrubber liquor.

14. The method of claim 13, further comprising:

maintaining a desired hydrogen peroxide concentration in the first scrubber liquor by regulating a flow of the first hydrogen peroxide solution; and removing a by-product stream containing sulfuric acid after attaining the desired sulfuric acid concentration in the first scrubber liquor.

15. The method of claim 14, further comprising:

sampling the recycled first scrubber liquor for a level of hydrogen peroxide; and controlling the level of hydrogen peroxide in a mixture of the first hydrogen peroxide solution and the recycled first scrubber liquor to be at least a predetermined level.

* * * * *